(12) United States Patent
Lindemann et al.

(10) Patent No.: US 8,844,690 B2
(45) Date of Patent: Sep. 30, 2014

(54) PISTON SEAL WITH CENTERING WASHER

(75) Inventors: Patrick M. Lindemann, Wooster, OH (US); Brian C. Zaugg, Wooster, OH (US); Nathan Yensho, Norton, OH (US); Alfredo Jimenez, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 416 days.

(21) Appl. No.: 13/238,213

(22) Filed: Sep. 21, 2011

(65) Prior Publication Data

US 2012/0073926 A1  Mar. 29, 2012

Related U.S. Application Data

(60) Provisional application No. 61/385,678, filed on Sep. 23, 2010.

(51) Int. Cl.
*F16H 45/02* (2006.01)

(52) U.S. Cl.
CPC ........ *F16H 45/02* (2013.01); *F16H 2045/0294* (2013.01); *F16H 2045/0205* (2013.01); *F16H 2045/0221* (2013.01)

USPC ...................................... 192/3.29; 192/110 R

(58) Field of Classification Search
USPC .................................................. 192/3.28–3.3
See application file for complete search history.

(56) References Cited

U.S. PATENT DOCUMENTS

| 6,561,330 | B2 | 5/2003 | Maienschein et al. |
| 6,948,602 | B2 * | 9/2005 | Arhab et al. ................. 192/3.29 |
| 7,513,346 | B2 * | 4/2009 | Degler et al. .................. 192/3.3 |
| 8,135,525 | B2 * | 3/2012 | Swank et al. .................... 701/69 |

* cited by examiner

*Primary Examiner* — Jacob S Scott
(74) *Attorney, Agent, or Firm* — Simpson & Simpson, PLLC

(57) ABSTRACT

A torque converter, including: a piston plate for a lock-up clutch, the piston plate including a circumferential surface forming an opening axially aligned with an axis of rotation for the torque converter; a ring-shaped element fixedly secured to the piston plate; and a seal in compressive engagement with the circumferential surface, axially aligned with the ring-shaped element, and including a surface facing radially inward for forming a seal with an input shaft inserted into the torque converter.

18 Claims, 6 Drawing Sheets

US 8,844,690 B2

PISTON SEAL WITH CENTERING WASHER

CROSS-REFERENCE TO RELATED APPLICATIONS

This application claims the benefit under 35 U.S.C. §119 (e) of U.S. Provisional Application No. 61/385,678 filed on Sep. 23, 2010 which application is incorporated herein by reference.

FIELD OF THE INVENTION

The present disclosure relates to seal and ring-shaped element for sealing a plate in a torque converter with respect to an input shaft inserted in the torque converter. In particular, the present disclosure relates to a seal and washer for sealing and centering a piston plate for a lock up clutch with respect to the input shaft.

BACKGROUND OF THE INVENTION

Known torque converter design includes using an output hub to connect a damper assembly to an input shaft inserted in the torque converter. According to this design, a piston plate for a lock up clutch in the torque converter is sealed with respect to the output hub.

BRIEF SUMMARY OF THE INVENTION

According to aspects illustrated herein, there is provided a torque converter, including: a piston plate for a lock-up clutch, the piston plate including a circumferential surface forming an opening axially aligned with an axis of rotation for the torque converter; a ring-shaped element fixedly secured to the piston plate; and a seal in compressive engagement with the circumferential surface, axially aligned with the ring-shaped element, and including a surface facing radially inward for forming a seal with an input shaft inserted into the torque converter.

According to aspects illustrated herein, there is provided a torque converter, including: a piston plate for a lock-up clutch; a ring-shaped element fixedly secured to the piston plate; and a seal sealed with respect to the piston plate, axially fixed with respect to the piston plate by a portion of the piston plate, and including a surface facing radially inward for forming a seal with an input shaft inserted into the torque converter.

According to aspects illustrated herein, there is provided a torque converter, including a piston plate for a lock-up clutch, a ring-shaped element, and a seal. The piston plate includes a circumferential surface forming an opening axially aligned with an axis of rotation for the torque converter and an edge formed by a radially disposed surface of the piston plate and the circumferential surface of the piston plate. The edge includes a portion at a first radial distance from the axis of rotation. The ring-shaped element is fixedly secured to a radially disposed surface of the piston plate and includes a portion axially aligned with the opening. The seal is sealed with respect to the circumferential surface, axially fixed by the portion of the edge, and includes a surface facing radially inward for forming a seal with an input shaft inserted into the torque converter, and an outer circumferential surface at a second radial distance, greater than the first radial distance, from the axis of rotation.

These and other objects and advantages of the present invention will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
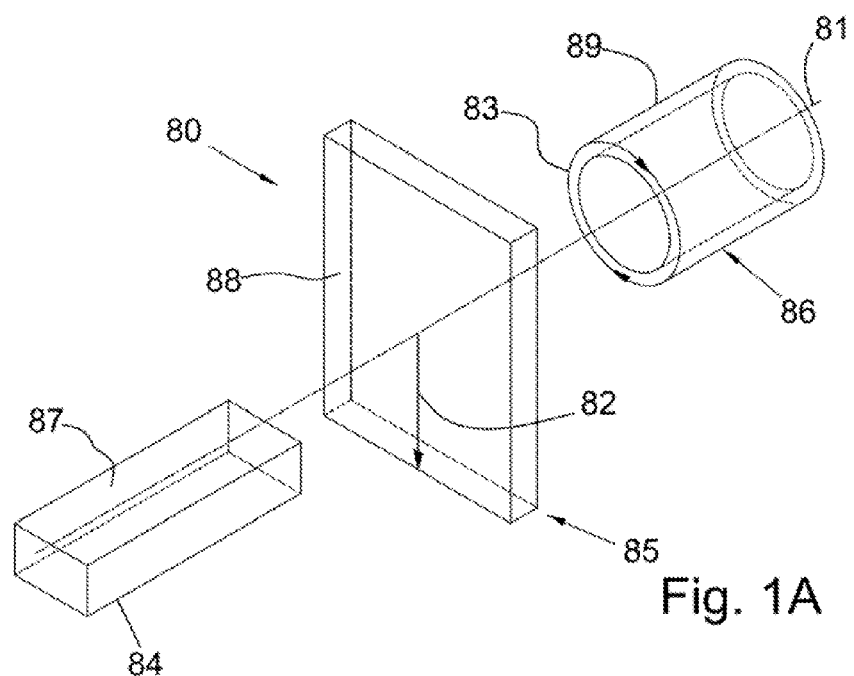
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
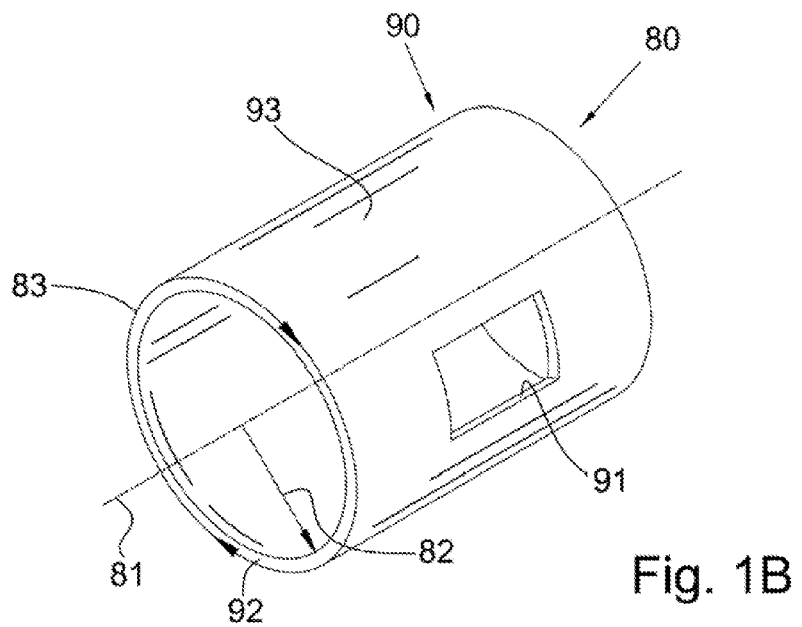
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
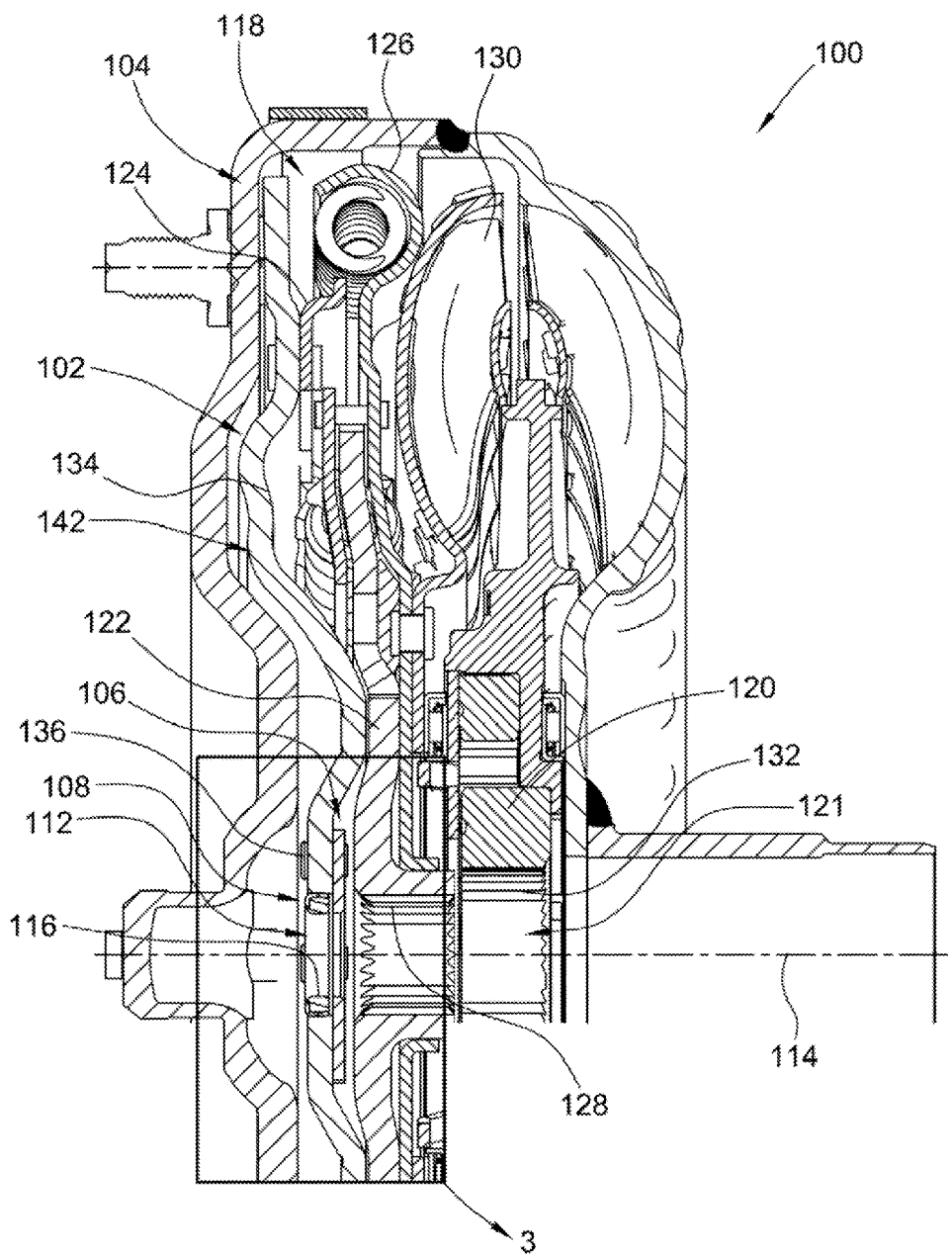
FIG. 2 is a partial cross-sectional view of a torque converter with a piston seal and ring-shaped element.

FIG. 2 is a partial cross-sectional view of torque converter 100 with a piston seal and ring-shaped element.

Figure 3A:
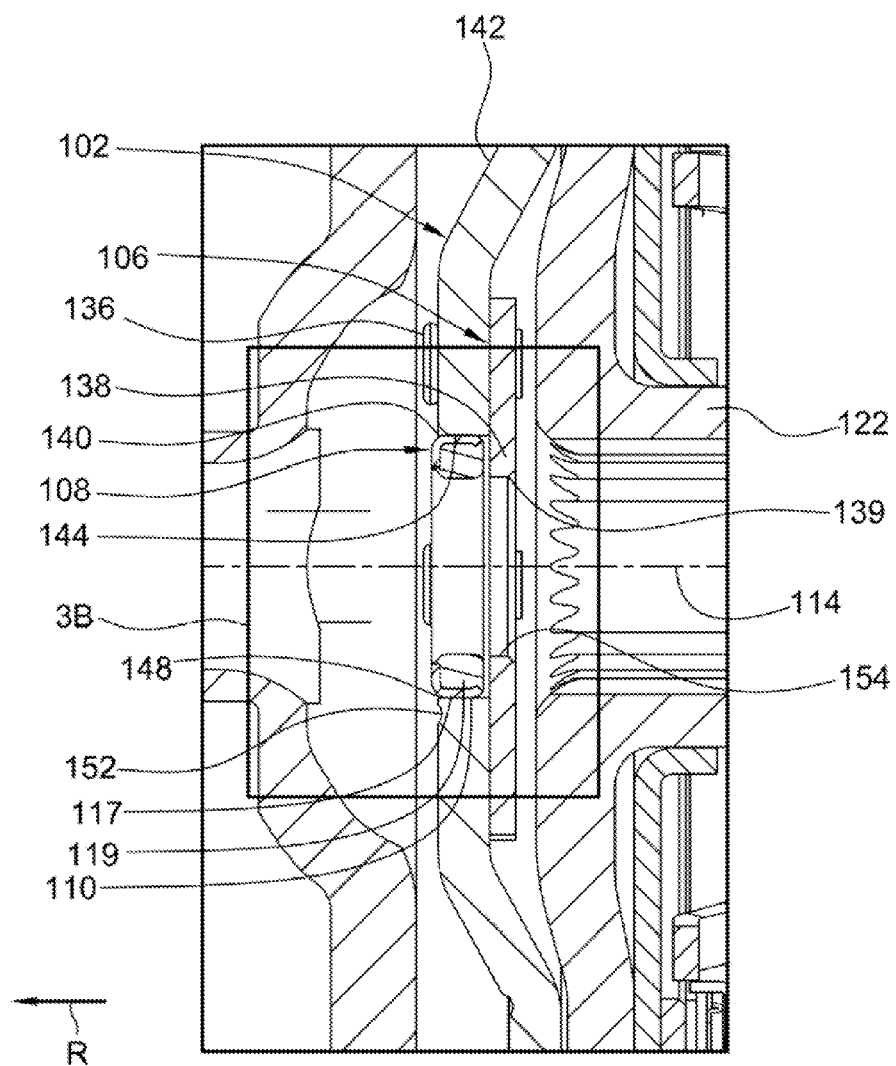
FIG. 3A is a detail of area 3 in FIG. 2.

FIG. 3A is a detail of area 3 in FIG. 2.

Figure 3B:
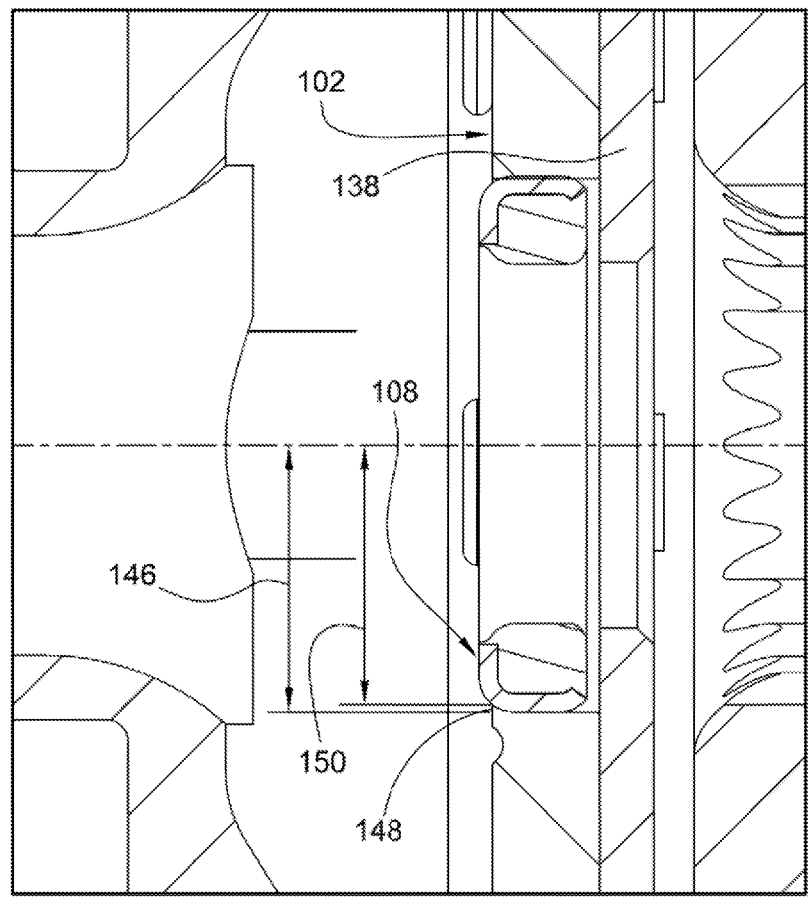
FIG. 3B is a detail of a portion of FIG. 3A.

FIG. 3B is a detail of a portion of FIG. 3A.

Figure 4:
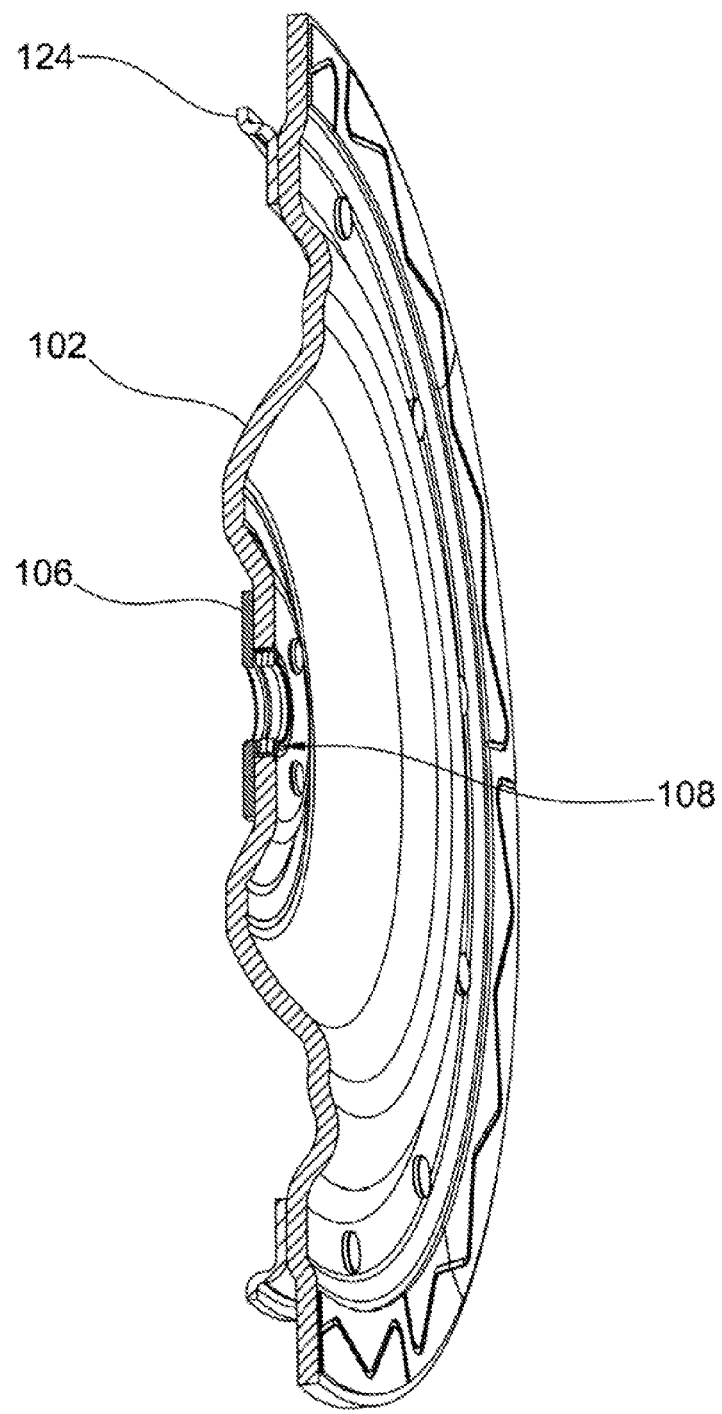
FIG. 4 is a perspective cross-sectional view of the piston plate, piston seal, and ring-shaped element shown in FIG. 2; and, FIGS. 5A through 5D are partial cross-sectional views of a torque converter with a piston seal.

FIG. 4 is a perspective cross-sectional view of the piston plate, piston seal, and ring-shaped element shown in FIG. 2. The following should be viewed in light of FIGS. 2 through 4. Torque converter 100 includes piston plate 102 for a lock-up clutch 104, ring-shaped element 106, and seal 108. The piston plate includes circumferential surface 110 forming opening 112 axially aligned with axis of rotation 114 for the torque converter. The ring-shaped element is fixedly secured to the piston plate as further described infra. The seal is in compressive engagement with the circumferential surface, is sealed with respect to the circumferential surface, is in contact with the ring-shaped element, and includes surface 116, facing radially inward, for forming a seal with an input shaft (not shown) inserted into the torque converter. The seal is fixed with respect to the piston plate as further described infra.

In one embodiment, the seal includes cover 117 and sealing material 119 fixedly secured to the cover. Cover 117 is made of any material known in the art, for example, metal. The sealing material is any sealing material known in the art, including, but not limited to fluoroelastomer, fluorocarbon, or ethylene acrylate. The cover is pressed into opening 112 and forms a liquid-tight seal with surface 110. Material 119 forms surface 116.

That is, for a typical arrangement in which torque converter 100 provides drive torque to a transmission (not shown), an input shaft for the transmission is installed, or inserted, into the torque converter in opening 121. In one embodiment, the torque converter includes damper assembly 118 and one-way clutch inner race 120. Race 120 includes surface 132 for engaging a stator shaft (not shown). The damper assembly includes flange 122 axially disposed between cover plates 124 and 126. The flange includes surface 128 for engaging the input shaft. Cover plate 126 is fixedly connected to turbine 130.

In one embodiment, the ring-shaped element is a washer. In one embodiment, the ring-shaped element is fixedly secured to radially disposed surface 134 of the piston plate by any means known in the art, for example, rivets 136. Although element 106 is shown facing the flange, it should be understood that element 106 could be installed on the opposite side of the piston plate. Portion 138 of the washer is axially aligned with opening 112, that is, portion 138 extends radially inward from surface 110. Portion 138 includes chamfer 139 that enables easier assembly with the input shaft. In one embodiment, the piston plate includes edge 140 formed by radially disposed surface 142 of the piston plate and surface 110 of the piston plate. The seal includes outer circumferential surface 144 at radial distance 146 from the axis. In one embodiment, at least portion 148 of edge 140 is at radial distance 150, less than radial distance 146, from the axis. Portion 148 of the piston plate extends radially inward with respect to edge 140 and portion 138 of the washer extends radially inward with respect to edge 140.

In one embodiment, portions 148 are formed by staking the piston plate at respective areas 152. That is, force applied at areas 152 forces the material forming the piston plate at edge 140 to bulge radially inward beyond surface 110 to relieve the pressure generated by the force. The bulging material acts to restrain axial displacement of the seal in direction R.

The washer is for centering the piston plate with respect to the axis of rotation, or with respect to the input shaft. For example, assuming the outside surface of the input shaft is the frame of reference for centering, surface 154 is in contact with the outside surface of the input shaft, and surface 154 and the washer are therefore centered with respect to the input shaft due to this contact. Due to the fixed position of the washer with respect to the piston plate, the piston plate also is centered with respect to the input shaft.

Figure 5A:
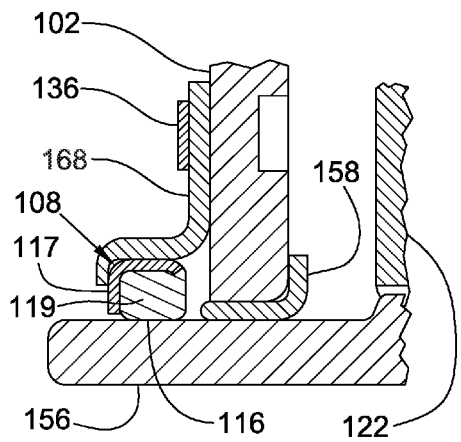
Figure 5B:
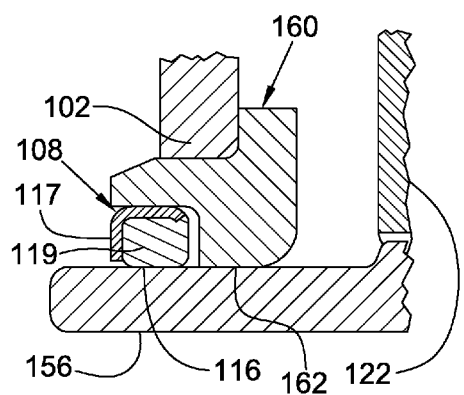
Figure 5C:
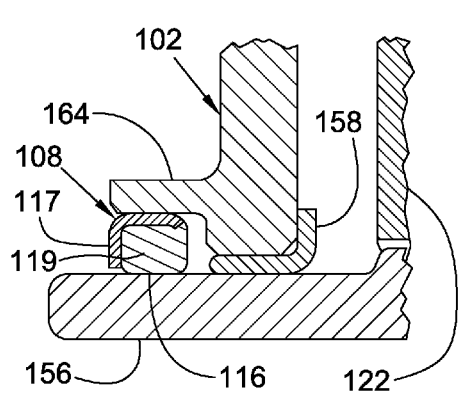
Figure 5D:
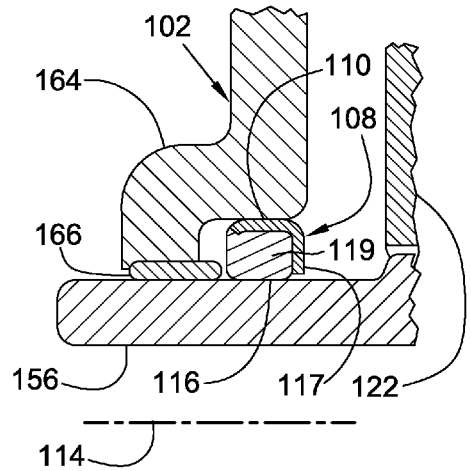

FIGS. 5A through 5D are partial cross-sectional views of a torque converter with a piston seal and transmission input shaft 156. In FIG. 5A, seal 108 is installed on washer 168 and the washer is riveted to the piston plate. Bushing 158 is installed on the piston plate. The bushing includes a lead-in radius to facilitate assembly with the transmission input shaft. In FIG. 5B, piston hub 160 includes area 162 that acts as a bushing, for example, area 162 is heat treated, and includes a lead-in radius to facilitate assembly with the transmission input shaft. Seal 108 is pressed into the hub and the hub is pressed onto the piston plate. In FIG. 5C, piston plate 102 includes neck 164. Bushing 158 is installed on the piston plate and includes a lead-in radius to facilitate assembly with the transmission input shaft. Seal 108 is pressed onto the piston plate at the neck. In FIG. 5D, piston plate 102 includes neck 164. Bushing 166 is installed on the piston plate at the neck. Seal 108 is pressed onto the piston plate at the neck and piston plate juncture. Centering of the piston plate is accomplished by bushings 158 or 166 or by area 162.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter, comprising:
   a piston plate for a lock-up clutch, the piston plate including a circumferential surface forming an opening axially aligned with an axis of rotation for the torque converter;
   a ring-shaped element for centering the piston plate with respect to the axis of rotation fixedly secured to the piston plate; and,
   a seal in compressive engagement with the circumferential surface, axially aligned with the ring-shaped element, and including a surface facing radially inward for forming a seal with an input shaft inserted into the torque converter.

2. The torque converter of claim 1 wherein the ring-shaped element is fixedly secured to a radially disposed surface of the piston plate.

3. The torque converter of claim 1 wherein:
the piston plate includes an edge formed by a radially disposed surface of the piston plate and the circumferential surface of the piston plate;
the seal includes an outer circumferential surface at a first radial distance from the axis; and,
at least a portion of the edge is at a second radial distance, less than the first radial distance, from the axis.

4. The torque converter of claim 1 wherein:
the ring-shaped element includes a portion axially aligned with the opening; and,
the seal is axially aligned with the portion of the ring-shaped element.

5. The torque converter of claim 1 wherein:
the seal includes an outer circumferential surface at a first radial distance from the axis;
the piston plate includes an edge formed by a radially disposed surface of the piston plate and the circumferential surface of the piston plate;
a portion of the edge is at a second radial distance, less than the first radial distance, from the axis;
the ring-shaped element includes a portion axially aligned with the opening; and,
a position of the seal with respect to the piston plate is axially fixed by the portion of the ring-shaped element and is axially offset from the portion of the edge.

6. The torque converter of claim 1 wherein the ring-shaped element is for centering the piston plate with respect to the input shaft.

7. The torque converter of claim 1 further comprising a damper assembly with a flange axially disposed between first and second cover plates and having a radially inwardly facing surface for engaging the input shaft.

8. A torque converter, comprising:
a piston plate for a lock-up clutch including a circumferential surface forming an opening axially aligned with an axis of rotation for the torque converter;
a ring-shaped element fixedly secured to the piston plate and including a portion axially aligned with the opening; and,
a seal sealed with respect to the piston plate, axially fixed with respect to the piston plate by a portion of the piston plate, in compressive engagement with the circumferential surface, and including a surface facing radially inward for forming a seal with an input shaft inserted into the torque converter.

9. The torque converter of claim 8 wherein:
the circumferential surface is at a first radial distance from the axis of rotation for the torque converter
the piston plate includes an edge formed by a radially disposed surface of the piston plate and the circumferential surface of the piston plate;
the respective portion of the piston plate includes a portion of the edge at a second radial distance, less than the first radial distance, from the axis; and,
a portion of the ring-shaped element is axially aligned with the opening.

10. A torque converter comprising:
an axis of rotation;
a piston plate including:
a first circumferential surface at a first radial distance from the axis of rotation; and,
a second circumferential surface at a second radial distance from the axis of rotation greater than the first radial distance;
a ring-shaped element:
in contact with the first, circumferential surface;
forming an opening through which the axis of rotation passes; and,
arranged to contact an input shaft inserted into the torque converter; and,
a seal including:
a cover fixedly secured to the second circumferential surface, and
material:
separate from the cover;
connected to the cover; and,
including a surface facing radially inward for forming a seal with the input shaft.

11. The torque converter of claim 10 wherein the ring-shaped element is separately formed from the piston plate.

12. The torque converter of claim 10, wherein. the ring-shaped element includes:
a first surface facing radially outward and in compressive engagement with the first circumferential surface; and,
a second surface facing radially inward and arranged to compressively engage the input Shaft.

13. The torque converter of claim 10, wherein the ring-shaped element is a washer, a piston hub, a bushing, or combination thereof.

14. The torque converter of claim 10, wherein the ring-shaped element is a hushing.

15. The torque converter of claim 10, wherein the ring-shaped element is arranged to radially center the piston with respect to the input shaft.

16. The torque converter of claim 10, wherein the piston plate, comprises a neck.

17. The torque converter of claim 16, where the neck connects the first circumferential surface to the second circumferential surface.

18. The torque converter of claim 10, wherein:
the ring-shaped element includes an outer circumferential surface at a third radial distance from the axis;
the piston plate includes an edge formed by a radially disposed surface of the piston plate and the first circumferential surface of the piston plate; and,
a portion of the edge is at a fourth radial distance, less than the third radial distance, from the axis.

* * * * *